United States Patent
Santoro et al.

(10) Patent No.: US 11,070,042 B2
(45) Date of Patent: Jul. 20, 2021

(54) LIQUID EPOXY BRUSH BARRIER

(71) Applicant: HUBBELL INCORPORATED, Shelton, CT (US)

(72) Inventors: Nicholas Adam Santoro, Edwardsville, IL (US); Christopher John Minski, St. Louis, MO (US); Michael Charles Schinner, Afton, MO (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 16/925,358

(22) Filed: Jul. 10, 2020

(65) Prior Publication Data
US 2021/0013707 A1 Jan. 14, 2021

Related U.S. Application Data

(60) Provisional application No. 63/018,869, filed on May 1, 2020, provisional application No. 62/873,329, filed on Jul. 12, 2019.

(51) Int. Cl.
*H02G 15/013* (2006.01)
*B29C 70/74* (2006.01)
(Continued)

(52) U.S. Cl.
CPC ......... *H02G 15/013* (2013.01); *B29C 70/745* (2013.01); *B29K 2063/00* (2013.01); *B29K 2995/0005* (2013.01); *B29L 2031/34* (2013.01)

(58) Field of Classification Search
CPC .. H02G 3/0666; H02G 3/0675; H02G 3/0683; H02G 3/06; H02G 3/0608;
(Continued)

(56) References Cited

U.S. PATENT DOCUMENTS 4,515,991 A * 5/1985 Hutchison ............. H02G 3/088
174/654
5,321,205 A * 6/1994 Bawa ..................... H02G 15/04
174/655
(Continued)

FOREIGN PATENT DOCUMENTS

GB  2178909 A  2/1987

OTHER PUBLICATIONS

EatonVideos: "Terminator (TM) II TMCX Cable Gland Installation", Youtbe, Sep. 30, 2015, 1 page. Retrieved from Internet: URL:https://www.youtube.com/watch?v=gQP36rSCCu8.
(Continued)

*Primary Examiner* — William H. Mayo, III
(74) *Attorney, Agent, or Firm* — Dilworth IP, LLC

(57) ABSTRACT

A barrier including an outer edge and a plurality of elements such as bristles projecting inwardly from the outer edge. An electrical fitting including a body having an inner cavity, an aperture within the inner cavity between a first portion and a second portion, and a barrier positioned within or adjacent to the aperture, the barrier including an outer edge and a plurality of bendable elements. A method of assembling an electrical fitting including providing a barrier including an outer edge and a plurality of bendable elements projecting inwardly, placing the barrier within an inner cavity of the electrical fitting, placing a conductor into the second portion of the inner cavity, a distal portion of the conductor extending through the barrier and into a first portion of the inner cavity, and filling the first portion of the inner cavity with a sealing compound.

24 Claims, 17 Drawing Sheets

(51) Int. Cl.
*B29K 63/00* (2006.01)
*B29L 31/34* (2006.01)

(58) Field of Classification Search
CPC ...... H02G 3/0616; H02G 3/0625; H02G 3/22; H02G 3/24; H02G 3/30; H02G 3/0691; H02G 15/007; H02G 15/02; H02G 15/04; H02G 15/20; H02G 15/24
USPC ............ 174/74 R, 78, 84 R, 88 C, 360
See application file for complete search history.

(56) References Cited

U.S. PATENT DOCUMENTS

| | | | |
|---|---|---|---|
| 7,507,907 B2* | 3/2009 | Mueller | H02G 3/0666 |
| | | | 174/74 R |
| 8,841,562 B2* | 9/2014 | Drotleff | H02G 3/0675 |
| | | | 174/360 |
| 8,872,027 B2 | 10/2014 | Proud | |
| 88,720,227 | 10/2014 | Proud | |
| 8,895,878 B2* | 11/2014 | Drotleff | H02G 3/0675 |
| | | | 174/654 |
| 9,484,133 B2 | 11/2016 | Proud | |
| 9,774,178 B2 | 9/2017 | Proud | |
| 10,008,845 B2* | 6/2018 | Maass | H02G 3/22 |
| 2008/0073102 A1 | 3/2008 | Mueller et al. | |
| 2012/0282793 A1 | 11/2012 | Brune et al. | |
| 2013/0211274 A1 | 8/2013 | Lai | |

OTHER PUBLICATIONS

International Search Report and Written Opinion of the International Searching Authority, Issued in International Application No. PCT/US2020/041474, dated Sep. 24, 2020, 16 pages.

* cited by examiner

US 11,070,042 B2

LIQUID EPOXY BRUSH BARRIER

FIELD OF THE INVENTION

The present disclosure relates to electrical fittings for protecting wiring, and more particularly, to a liquid epoxy barrier element for use in electrical fittings.

BACKGROUND

Electrical fittings may include, for example, cable connectors, pipe fittings, seal off fittings, and cable glands. A cable gland is a protective device for physically and electrically routing a cable, such as an electrical cable or optical fiber cable. The electrical cable may contain several electrically conductive elements, each typically including insulated copper wiring, to transmit power and/or electrical signals. The optical fiber cable may contain several optical fibers capable of carrying light in order to transmit optical signals. Cable glands are also sometimes known as cable connectors or cable fittings and may be constructed from metallic or non-metallic materials, depending on the intended application. U.S. Pat. No. 10,008,845, incorporated herein by reference, discloses some exemplary cable glands.

Cable glands are used with many different types of electrical power, control, instrumentation, data and telecommunications cables. They are used as a sealing and termination device to ensure that the enclosure supporting the cable inside maintains an internal environment suitable for enabling a cable to perform its intended functions in a variety of different external environments. Some of these external environments can be very hazardous to the functioning and performance of the enclosed cable without the cable gland. For example, the types of hazardous environments cable glands are used in include fresh and saltwater, temperature extremes, corrosive chemicals, and combustible or explosive materials.

One common application of cable glands and other electrical fittings is to seal cable and wire entries to electrical junction boxes or other electrical equipment. The electrical conductors may be embedded in a sealing compound contained in all or a portion of the cable gland. The compound provides a barrier to contain explosions within the electrical enclosures. The compound is generally applied as a liquid or putty during assembly and takes time to cure and harden. Measures must be taken to prevent the compound from spreading within or leaking out of the cable gland during the curing process. Packing fibers and wool materials are often packed in the cable gland to retain the compound but are difficult to use and may not provide a sufficient barrier.

The present invention solves these and other problems in the prior art.

SUMMARY

In one exemplary embodiment according the present disclosure, a brush barrier is provided including an outer rim and a plurality of bristles attached to and extending inwardly from the outer rim. One application for the brush barrier according to the present disclosure is in the field of electrical fittings such as cable connectors, pipe fittings, cable glands, and seal off fittings, among others.

In one exemplary embodiment according the present disclosure, an electrical fitting includes a body having an inner cavity for receiving a plurality of conductors, an aperture within the inner cavity between a first portion of the inner cavity and a second portion of the inner cavity, and a brush barrier defining or positioned within or adjacent to the aperture, the brush barrier including an outer rim and a plurality of bristles attached to and extending inwardly from the outer rim. Conductors may at least partially displace and pass through the bristles. In some embodiments, the bristles have distal ends defining a central opening in the brush barrier, the conductors at least partially passing through the central opening.

The electrical fitting is adapted to receive a sealing compound within the first portion of the inner cavity adjacent to the brush barrier, the sealing compound being at least partially prevented from propagating into the second portion of the inner cavity by the brush barrier.

In some embodiments, the conductors are housed in a cable extending at least partially into the inner cavity. In some embodiments, the bristles have distal ends defining a central opening in the brush barrier, the conductors at least partially passing through the central opening.

In some embodiments, the aperture includes an abutment, wherein the brush barrier rests against the abutment. The fitting may further include a stop element engaged within the inner cavity and securing the brush barrier against the abutment. The stop element may be in threaded engagement with an inner surface of the inner cavity. The stop element may be a lock ring or a rubber grommet. In other embodiments, the brush barrier is at least partially secured within the inner cavity by friction between the outer rim and an inner surface of the inner cavity. In some embodiments, the outer rim of the brush barrier is continuous. In other embodiments, the outer rim of the brush barrier is non-continuous including a gap. In some embodiments, the outer rim of the brush barrier has a helical shape. The outer rim of the brush barrier may be comprised of at least one of brass, galvanized steel, stainless steel, or a polymer. The bristles of the brush barrier by be comprised of a synthetic fiber, a natural fiber, or a metal.

In some embodiments, the electrical fitting includes an entry component and a potting chamber slidably engaged within the entry component, wherein an interior of the potting chamber defines at least a portion of the inner cavity. In some embodiments, the second portion of the inner cavity, defined in the potting chamber, is tapered such that it has an inner diameter that decreases along a length of the second portion of the inner cavity.

In one exemplary embodiment according the present disclosure, an electrical fitting includes a body having an inner cavity for receiving a plurality of conductors, an aperture within the inner cavity between a first portion of the inner cavity and a second portion of the inner cavity, and a barrier positioned within or adjacent to the aperture. The barrier includes an outer edge and a plurality of bendable elements extending inwardly from the outer edge. Conductors may pass through and at least partially bend the bendable elements. The barrier is one of a felt fiber barrier including a plurality of slices, the plurality of elements being wedged sections defined by the slices, or a brush barrier including an outer rim at the outer edge, the plurality of elements being bristles attached to and extending inwardly from the outer rim.

In one exemplary embodiment according the present disclosure, a method of assembling an electrical fitting includes steps of providing a barrier including an outer edge or rim and a plurality of bendable elements extending inwardly from the outer edge, placing the barrier within an inner cavity of the electrical fitting between a first portion of the inner cavity and a second portion of the inner cavity, placing a cable or at least one conductor into the second portion of the inner cavity, a distal portion of the at least one conductor extending through the barrier and into the first portion of the inner cavity, and filling the first portion of the inner cavity with a sealing compound such that the barrier substantially prevents leakage of the sealing compound into the second portion of the inner cavity.

In some embodiments, the barrier is felt fiber barrier including a plurality of slices, the plurality of elements being wedged sections defined by the slices. In other embodiments, the barrier is a brush barrier including an outer rim at the outer edge, the plurality of elements being bristles attached to and extending inwardly from the outer rim. The plurality of bristles may have distal ends defining a central opening in the brush barrier, the conductors at least partially passing through the central opening. At least a portion of the plurality of bristles may bend around or against the conductors.

The outer rim of the brush barrier may, for example, be comprised of metal and the bristles of the brush barrier comprised of nylon. In some embodiments, the step of placing the at least one conductor into the second portion of the inner cavity includes placing a portion of the at least one conductor in contact with the bristles to provide a grounding path.

In some embodiments, the step of placing the barrier in the inner cavity includes placing the barrier against an abutment in the inner cavity. In some embodiments, the barrier includes a first side and a second side, the second side being adjacent to the abutment, the method further including the step of securing a stop element within the inner cavity against the first side of the barrier. The stop element may be in threaded engagement with an inner surface of the inner cavity. The stop element may be a rubber grommet.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

A brush barrier and electrical fittings, such as cable connectors, pipe fittings, cable glands, and seal off fittings, including such brush barrier are disclosed herein. Reference will now be made in detail to the illustrative embodiments of the present disclosure, which are illustrated in the accompanying figures.

Figure 1:
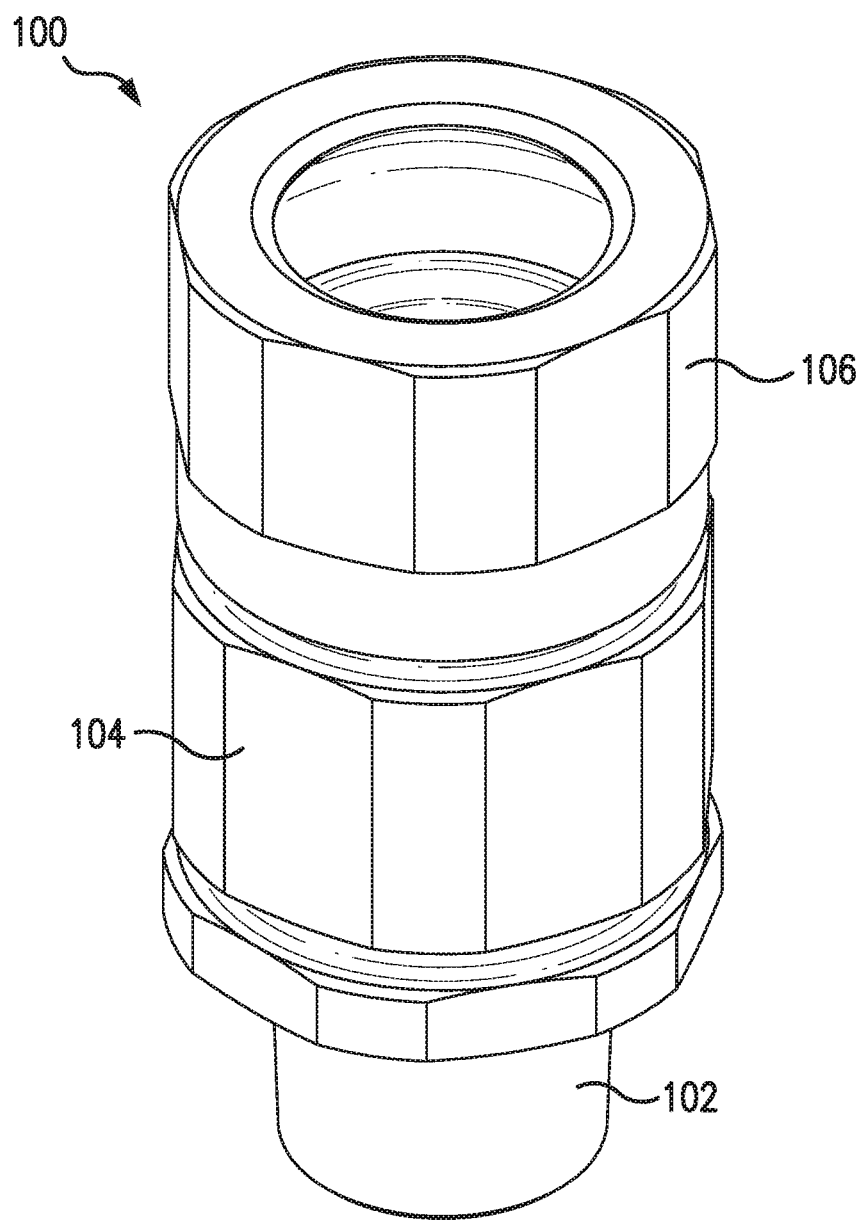
FIG. 1 is a perspective view of an electrical fitting according to an exemplary embodiment of the present disclosure.
Figure 2:
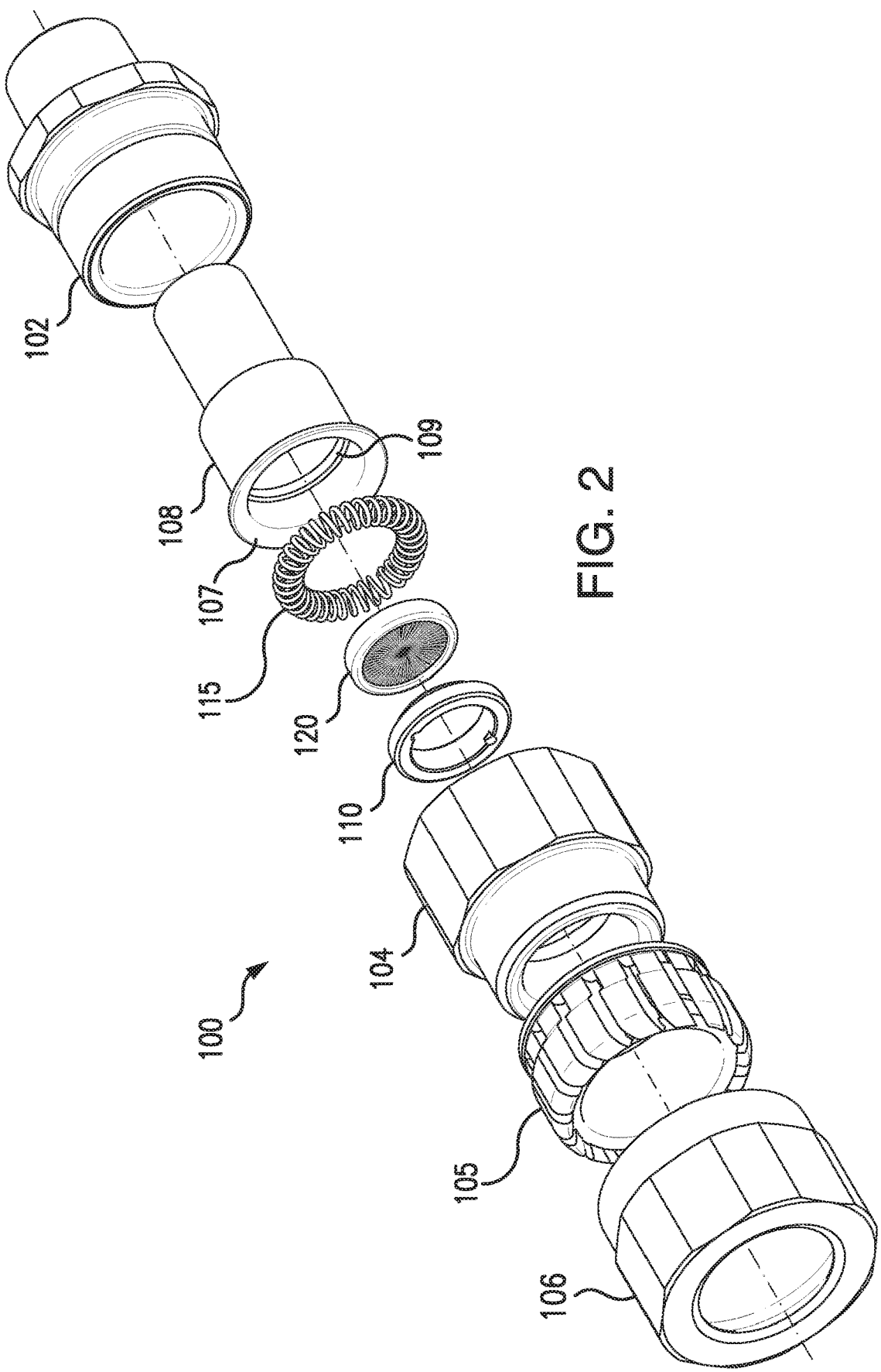
FIG. 2 is an exploded view of the electrical fitting shown in FIG. 1.

FIGS. 1-2 illustrate an electrical fitting 100, in particular a cable gland, according to an exemplary embodiment of the present disclosure. The electrical fitting 100 includes an entry component 102, a middle nut 104, a compressible back nut clamp 105, and a back nut 106. In the exemplary embodiment, the middle nut 104 is secured to the entry component 102 and the back nut 106 via threaded engagements (not shown).

A potting chamber 108 is slidably engaged within the entry component 102. The potting chamber 108 has proximal portion with a flange 107 that engages with a distal end of the entry component 102. The potting chamber 108 has a first cylindrical cavity having a first inner surface with a first inner diameter. The first inner surface may include a threaded portion 109 and an internal abutment 111 (see FIG.

6A). The potting chamber 108 also has a distal portion with a second cylindrical cavity having a second inner surface with a second inner diameter. In the exemplary embodiment, the second inner diameter is less than the first inner diameter. An aperture is defined between the first cylindrical cavity and the second cylindrical cavity.

The electrical fitting 100 may be comprised of a variety of different materials, such as metals and/or plastics. In the exemplary embodiment, the electrical fitting 100 is comprised primarily of aluminum.

In some embodiments, the electrical fitting 100 includes one or more O-rings and/or seals between the components. For example, the entry component 102 of the electrical fitting 100 may include a groove 103 (see FIG. 6A) arounds its outer surface for an O-ring to be positioned between the entry component and the middle nut 104. In one embodiment, the electrical fitting 100 includes O-rings comprised of Nitrile and at least one seal comprised of a thermoplastic elastomer. The electrical fitting 100 may also include a grounding spring 115.

The electrical fitting 100 further includes a disk brush or brush barrier 120 positioned in an inner cavity of the electrical fitting 100. The brush barrier 120 is used to prevent sealing compound (e.g., liquid epoxy) from passing beyond the brush barrier 120 before it cures within the electrical fitting 100. In the exemplary embodiment, the brush barrier 120 is positioned in the potting chamber 108 though it may be positioned at different locations in the inner cavity. A stop element, such as an armor stop 110, may be used to secure the brush barrier 120 in the potting chamber 108. In an exemplary embodiment shown in FIGS. 2 and 6A-6C, the armor stop 110 is threaded on its outer surface to engage with threads 109 on the first inner diameter of the potting chamber 108 and secure the brush barrier 120 against the abutment 111.

Figure 3:
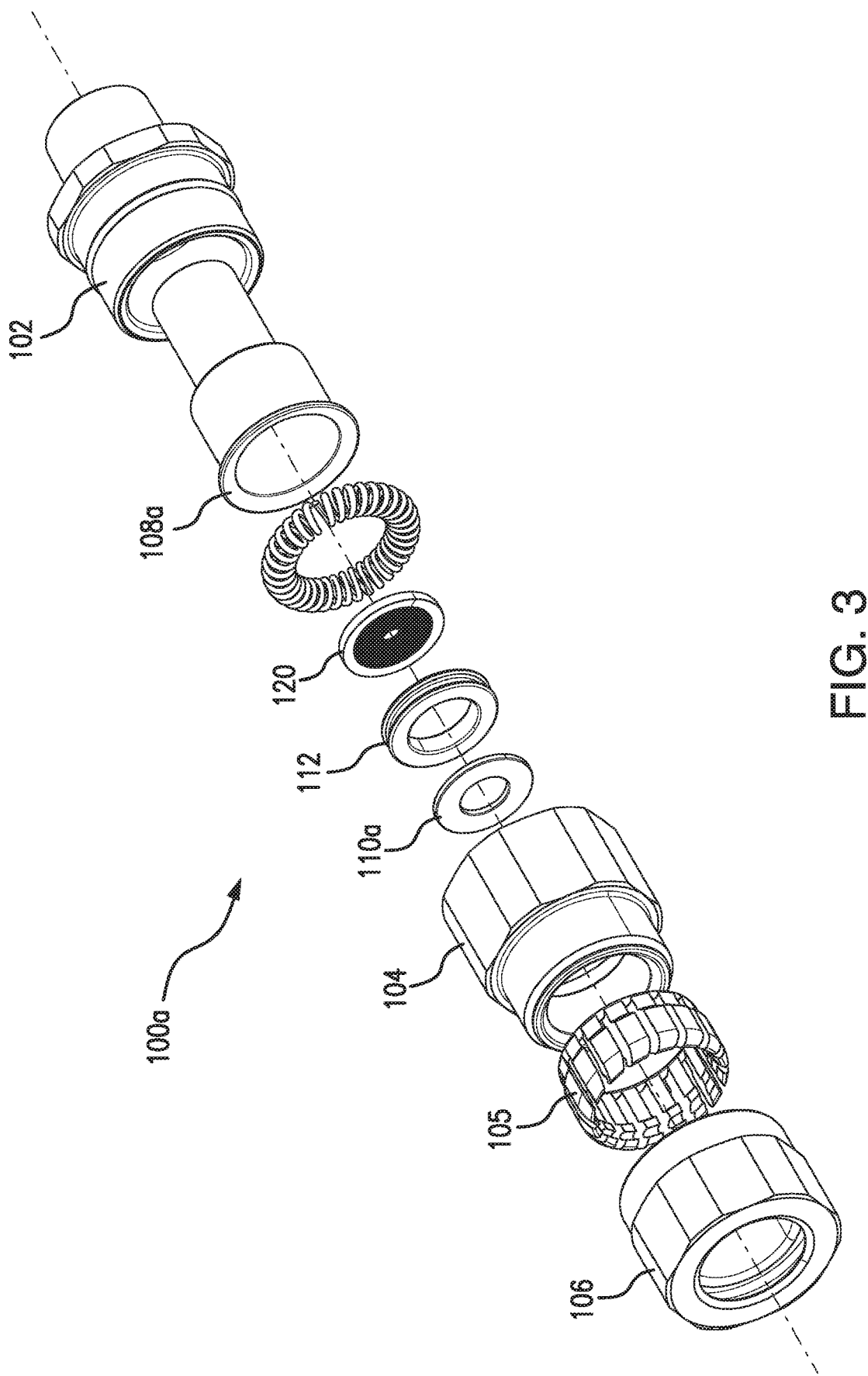
FIG. 3 is another exploded view of an electrical fitting of the type shown in FIG. 1.
Figure 7:
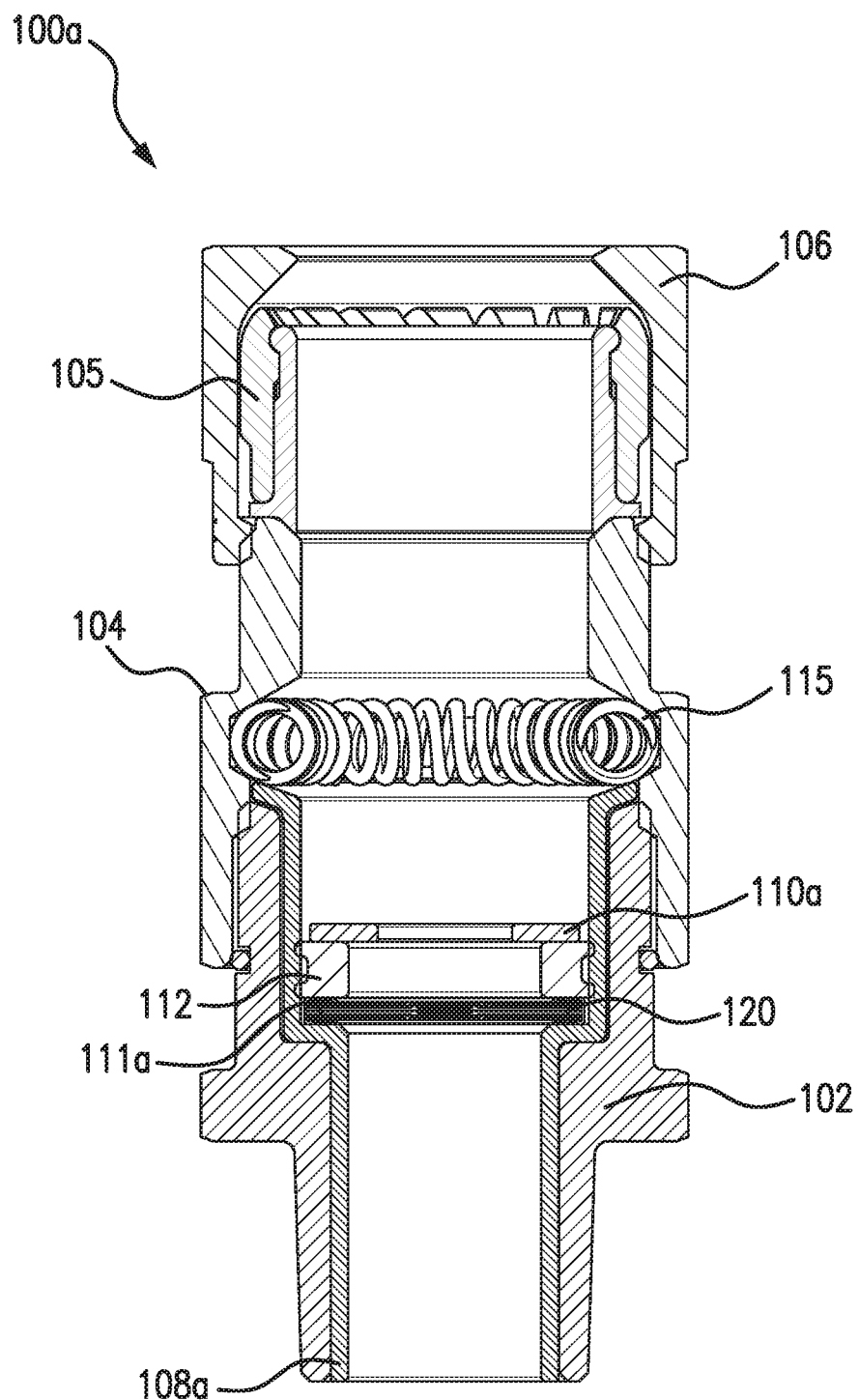
FIG. 7 is a sectional view of an electrical fitting according to an exemplary embodiment of the present disclosure.

As shown in FIGS. 3 and 7, in some embodiments the armor stop 110a is not threaded nor used to secure the brush barrier 120 in the potting chamber 108a. In the exemplary embodiment, the electrical fitting 100a includes a grommet 112 (e.g., positioned between the armor stop 110a and the brush barrier 120) for securing the brush barrier 120 in the potting chamber 108a. The grommet 112 is preferably made of rubber (e.g., a silicone rubber having a shore hardness of about 80). The grommet 112 has a central opening and an outer groove defining upper and lower lips which engage against the inner diameter of the potting chamber 108a.

Figure 4A:
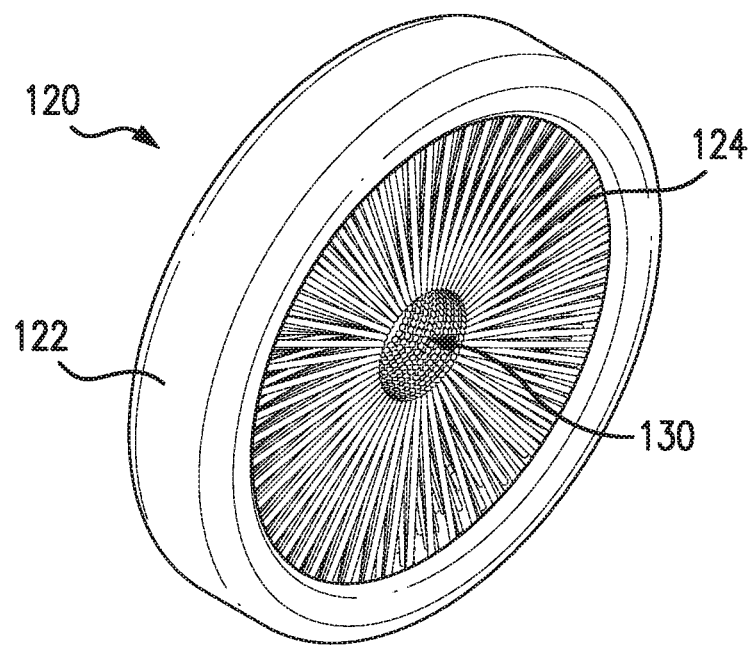
FIGS. 4A-4B are perspective and front views, respectively, of a brush barrier according to an exemplary embodiment of the present disclosure.
Figure 4B:
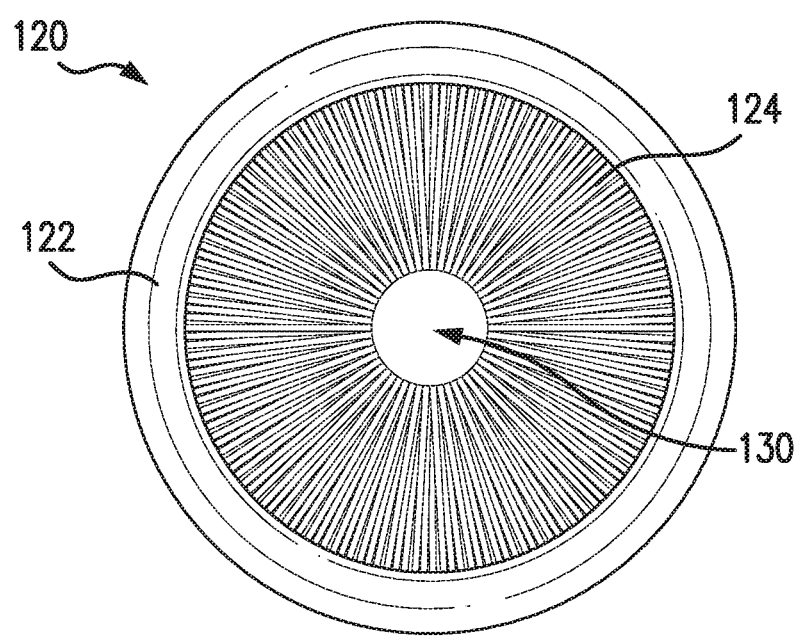

FIGS. 4A-4B are perspective and front views, respectively, of the brush barrier 120 according to an exemplary embodiment of the present disclosure. The brush barrier 120 includes an outer ring or rim 122 and a plurality of bristles 124 secured to the outer rim 122. The bristles 124 project inward and terminate to define an opening 130. The opening 130 may be different sizes (e.g., about 10-25% of the outside diameter, such as about 14-20%) or, in some embodiments, the bristles 124 terminate with little or no opening. In one embodiment, the bristles 124 are each formed in a loop with the distal ends attached to the outer rim 122.

The brush barrier 120 may be manufactured in a plurality of different sizes and shapes to accommodate different applications. In the exemplary embodiment, the bristles 124 are comprised of synthetic fibers such as nylon, polyester, polypropylene, or other polymers. In other embodiments, the bristles 124 may be comprised of natural fibers such as animal bristles (e.g., horsehair or other animal fibers) and vegetable fibers. The bristles 124 may also be comprised of metal wire filaments (e.g., of carbon steel, stainless steel, galvanized steel, bronze, or brass) and, in some embodiments, contact the cable and/or portion thereof to provide a grounding path. The outer rim 122 may be comprised of a metal such as carbon steel, stainless steel, galvanized steel, bronze, or brass. The outer rim 122 may alternatively be comprised of polymer such as plastic.

The bristles 124 receive and at least partially surround conductors while maintaining a sufficient barrier to prevent sealing compounds from passing through. The bristles 124 can bend and separate from one another to conform around the irregular shape and position of conductors extending therethrough and fills voids between the conductors.

Figure 5A:
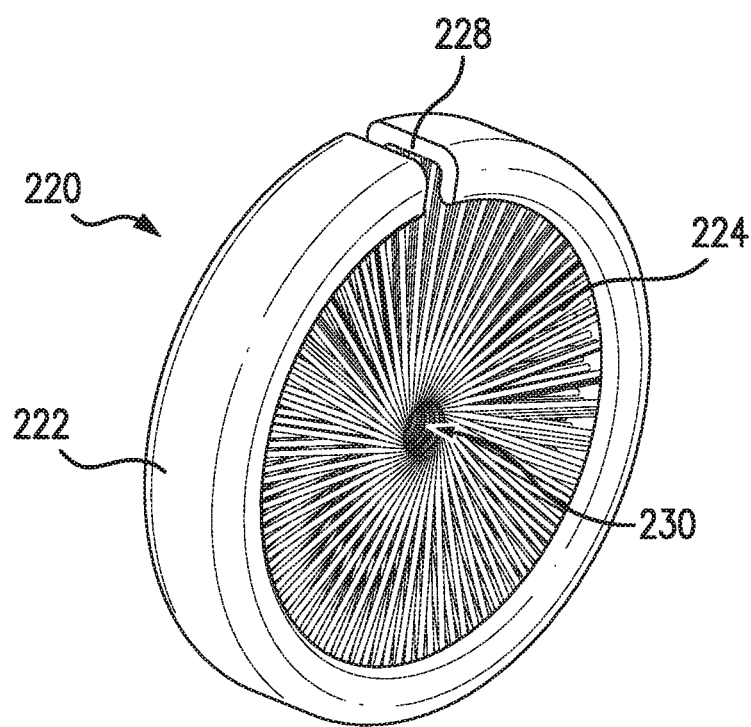
FIGS. 5A-5B are perspective and front views, respectively, of a brush barrier according to an exemplary embodiment of the present disclosure.
Figure 5B:
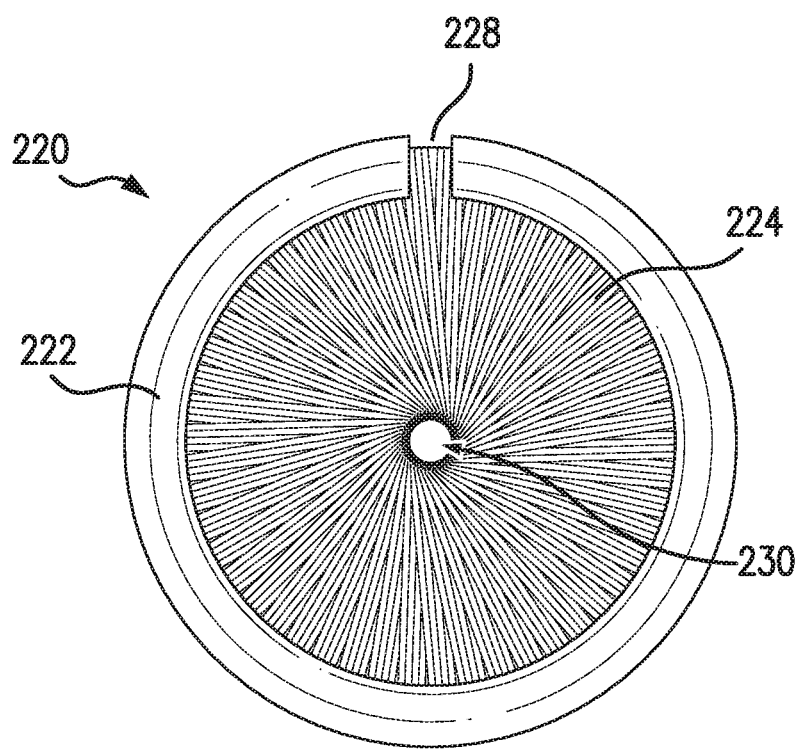

FIGS. 5A-5B are perspective and front views, respectively, of an alternate brush barrier 220 according to an exemplary embodiment of the present disclosure. In this embodiment, the brush barrier 220 has a non-continuous outer rim 222 including a split or gap 228. This allows the brush barrier 220 to be compressed in diameter or in some cases expanded to accommodate different opening sizes.

In some embodiments, the ends of the outer rim 222 are not adjacent to one another in the same plane and are instead offset in an axial direction creating a spiral or coil arrangement. Such embodiments provide additional axial length to the brush barrier resulting in additional contact along the length of the cable and/or conductors. For example, the outer rim 222 may be a helical coil arrangement with two or more coils (e.g., or three coils, six coils, ten coils or more). The coil preferably has a constant diameter along its length, though in some embodiments the coil may has a decreasing diameter along its length creating a conical shape to accommodate different applications and fittings.

Figure 6A:
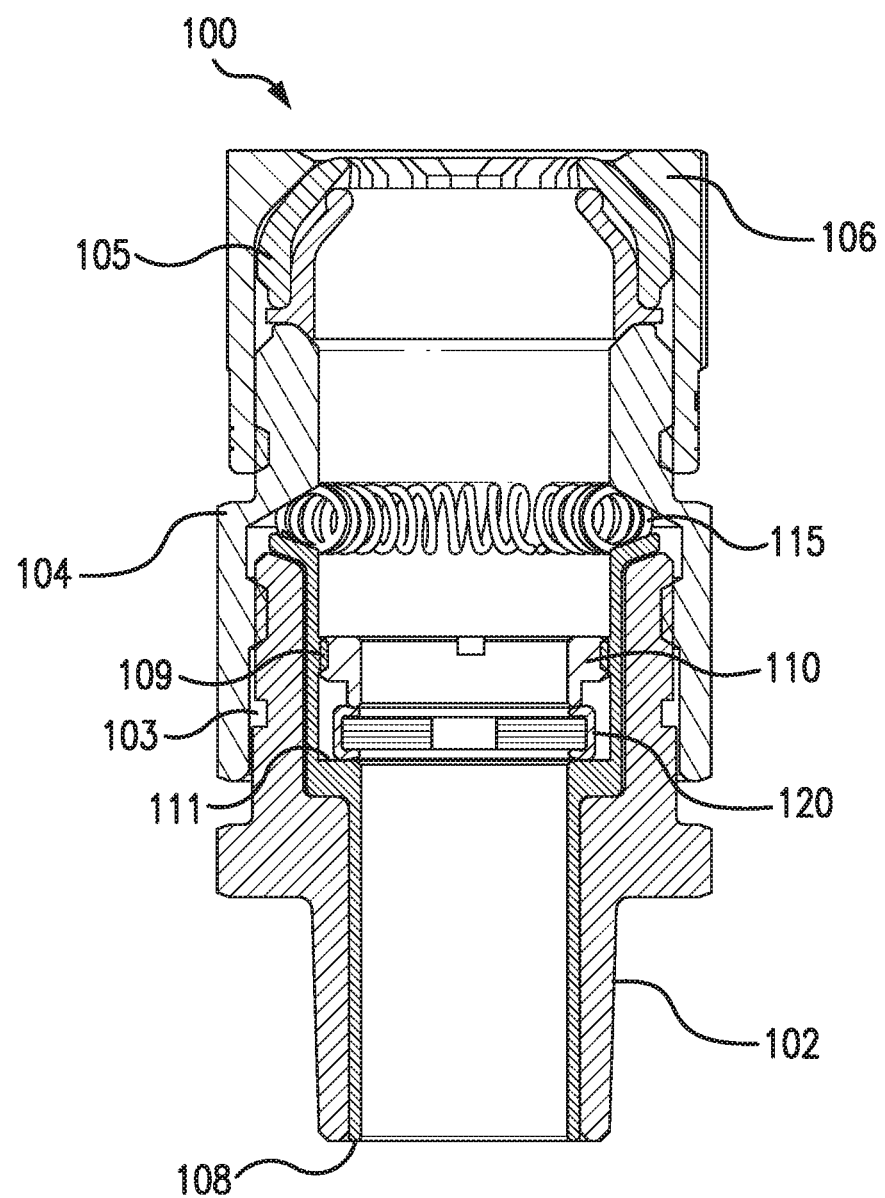
FIG. 6A is a sectional view of an electrical fitting according to an exemplary embodiment of the present disclosure.
Figure 6B:
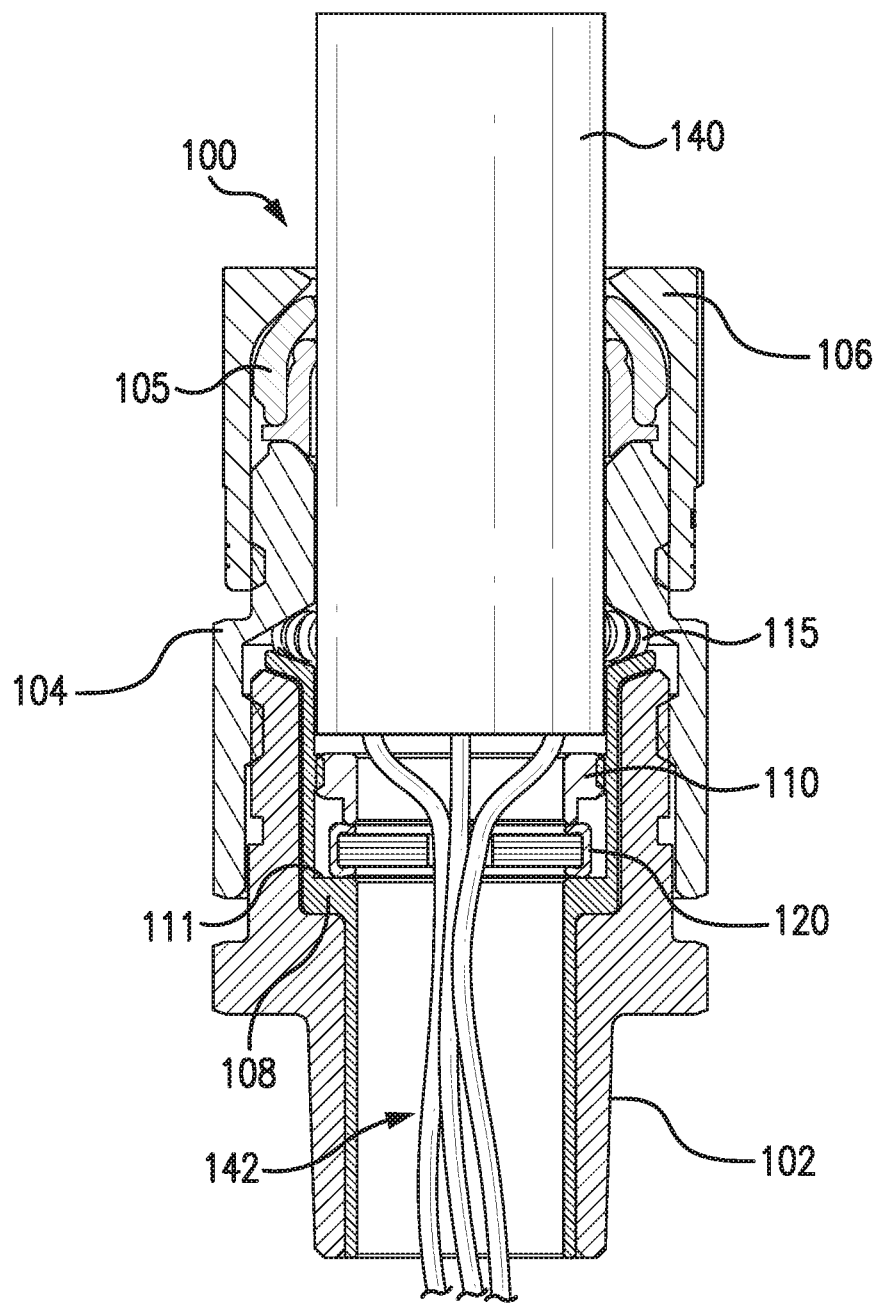
FIG. 6B is another sectional view of the electrical fitting shown in FIG. 6A including a cable extending therethrough.

FIGS. 6A-6B are sectional views of an electrical fitting 100 according to an exemplary embodiment of the present disclosure without and with a cable 140 extended therethrough, respectively. The cable 140 has a plurality of conductors 142 such as electrically conductive elements to transmit power or electrical signals and/or optical fibers to carry light in order to transmit optical signals. As shown, the brush barrier 120 is secured in the potting chamber 108, against abutment 111, by means of the armor stop 110. Other embodiments may include different securing mechanisms to secure the brush barrier 120, such as the grommet 112 shown in FIG. 7. Alternately, the brush barrier 120 may rest on the abutment 111 without a separate securing mechanism (see, e.g., FIG. 8).

The brush barrier 120 is positioned between a first portion of an inner cavity (below the brush barrier 120 in FIGS. 6A-6B) and a second portion of the inner cavity (above the brush barrier 120 in FIGS. 6A-6B). The brush barrier 120 may be in or adjacent to an aperture defined between the first and second portions of the inner cavity. The brush barrier 120 receives and at least partially surrounds the conductors 142 of the cable 140 while maintaining a sufficient barrier to prevent sealing compounds from passing through.

Figure 6C:
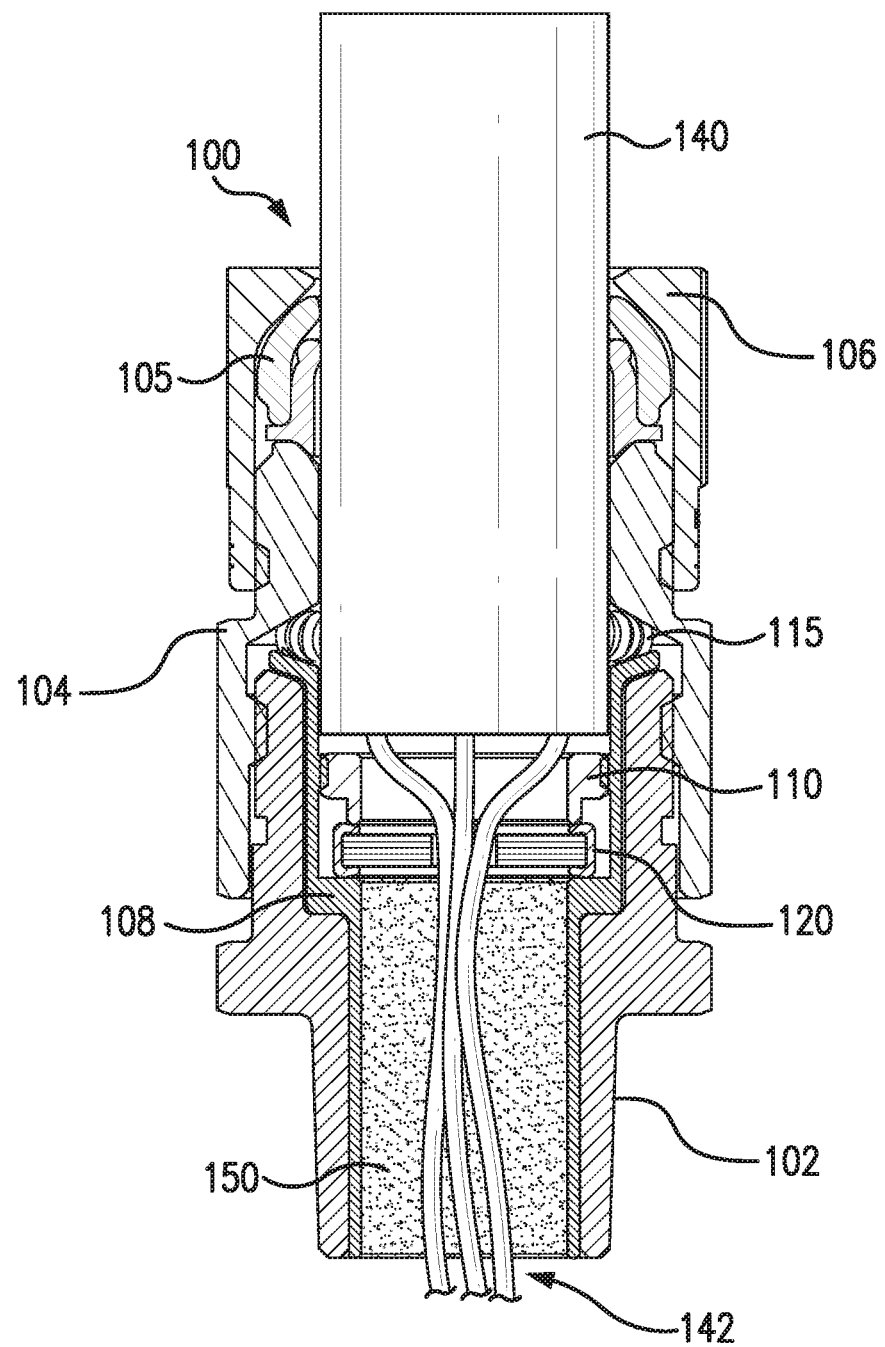
FIG. 6C is another sectional view of the electrical fitting shown in FIG. 6B including the cable and a sealing compound.

FIG. 6C illustrates the electrical fitting 100 with a sealing compound 150 at least partially filling the potting chamber 108 which, in this embodiment, defines the first portion of the inner cavity of the electrical fitting 100. The sealing compound 150 may be, for example, a filler compound, an epoxy, and/or a cement. With the cable 140 in place, the sealing compound 150 is added to the potting chamber 108 in a liquid or malleable form and is prevented from passing beyond the opening, into the second portion of the inner cavity, by the brush barrier 120 while the sealing compound 150 cures.

Figure 8:
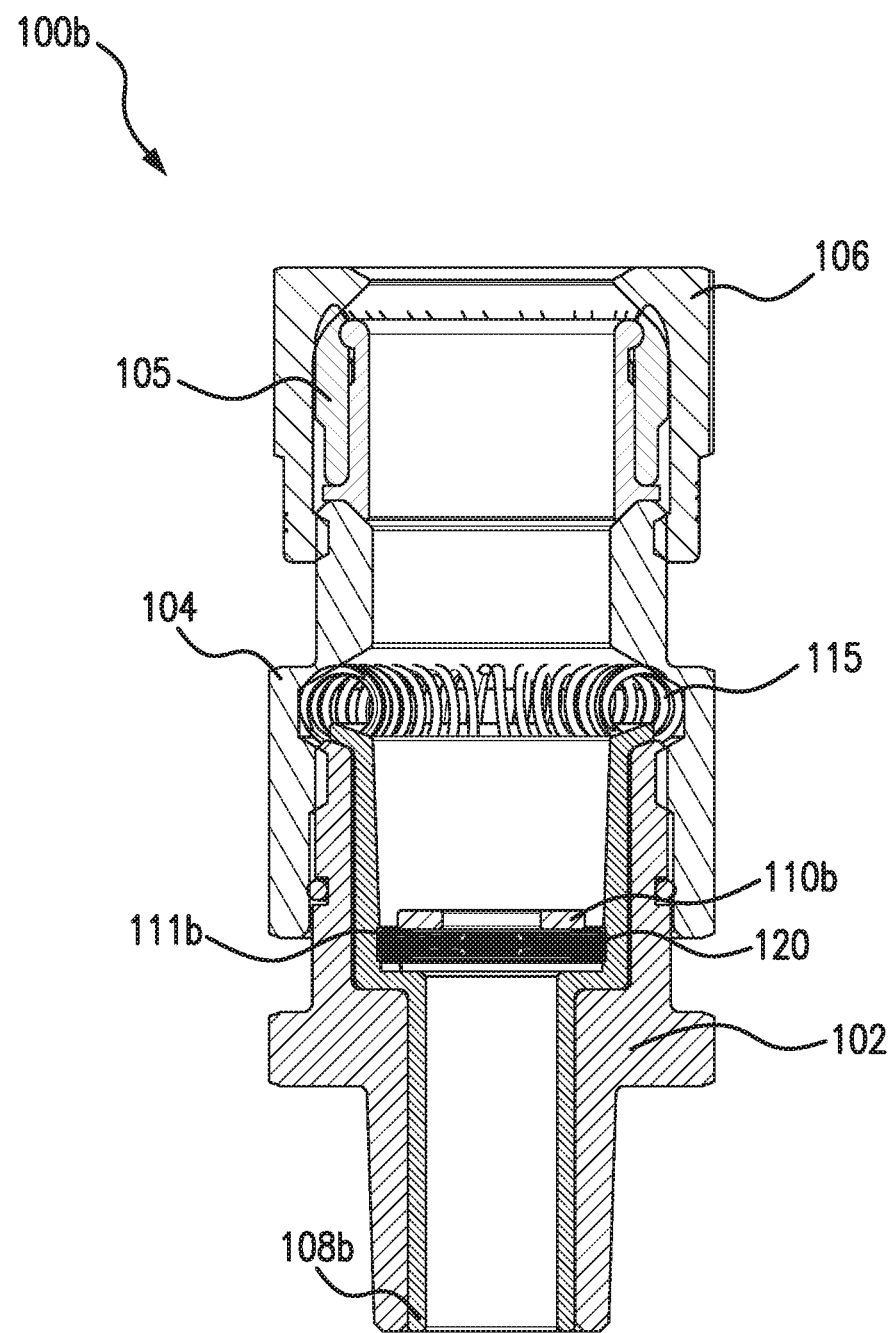
FIG. 8 is a sectional view of an electrical fitting according to an exemplary embodiment of the present disclosure.

FIG. 8 illustrates a variation of an electrical fitting 100b having a potting chamber 108b with a tapered upper inner cavity. In the exemplary embodiment, the brush barrier 120 is pressed into the potting chamber 108*b* which tapers from a larger diameter at the top to a smaller diameter at the bottom (at the abutment 111*b*) to secure the brush barrier 120 in the potting chamber 120 by friction.

Figure 9A:
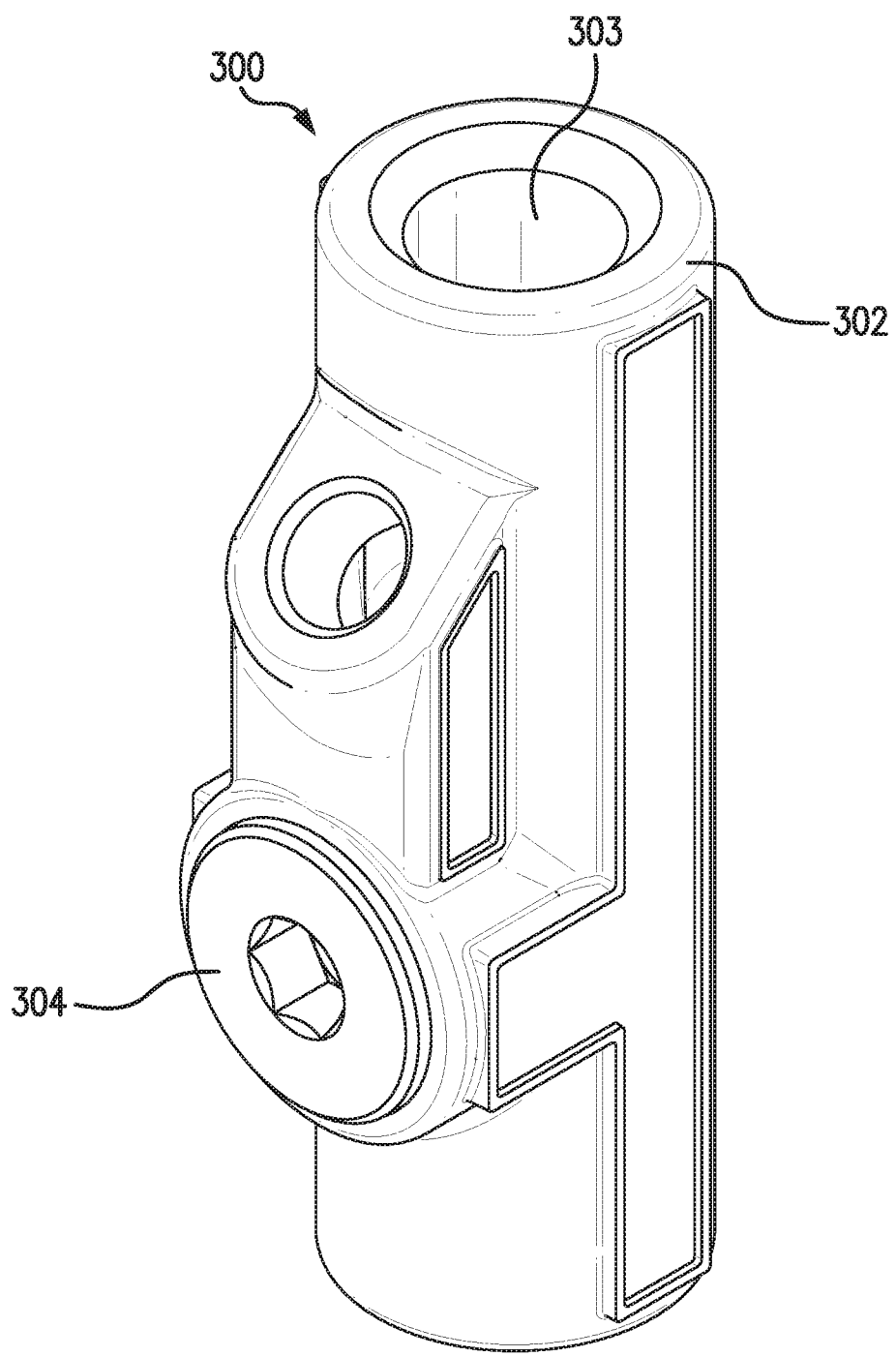
FIG. 9A is a perspective view of an electrical fitting according to an exemplary embodiment of the present disclosure.
Figure 9B:
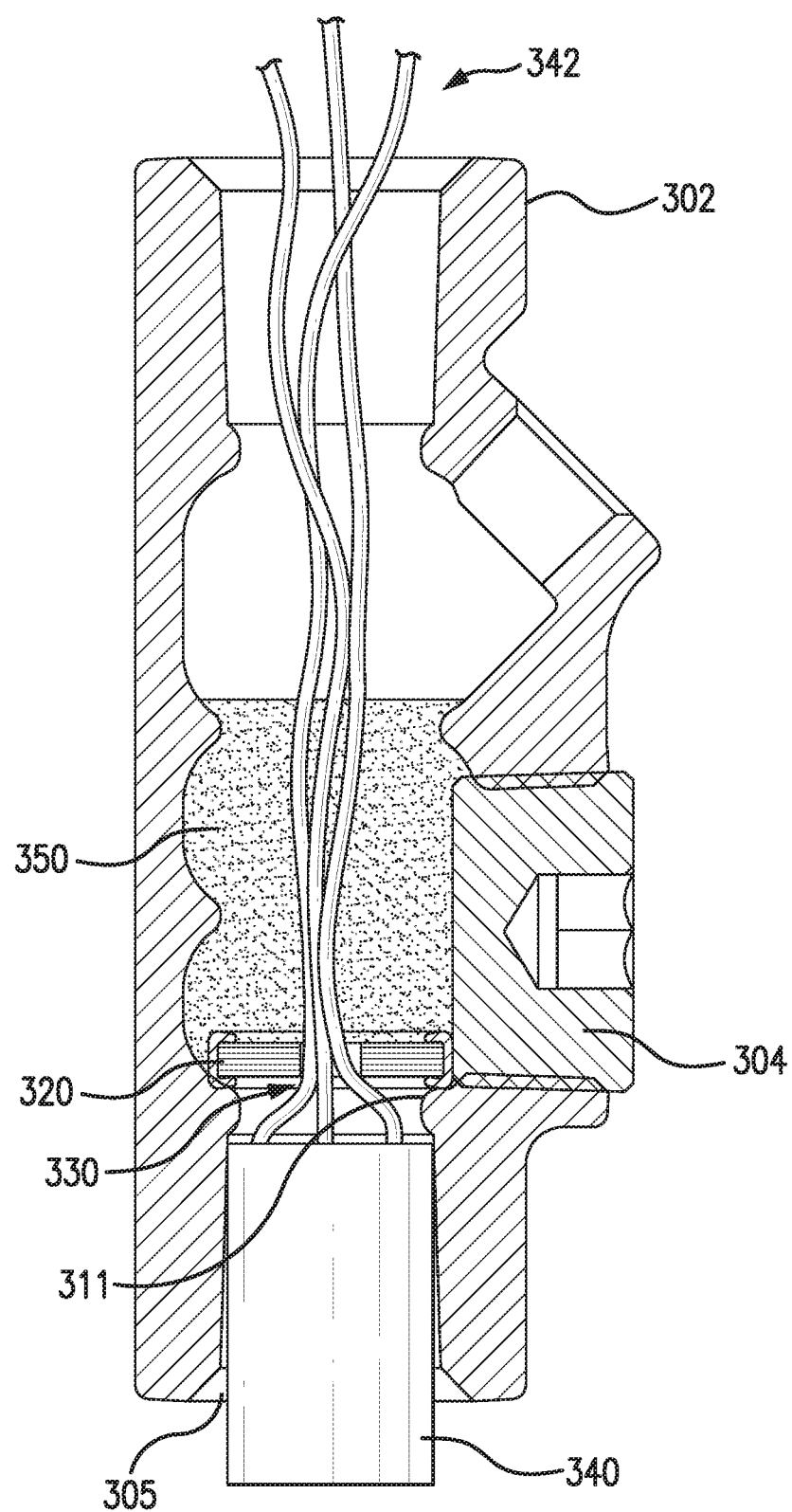
FIG. 9B is a sectional view of the electrical fitting shown in FIG. 9A including a cable and a sealing compound.

FIGS. 9A-9B illustrate another electrical fitting 300, in particular a seal off fitting, according to an exemplary embodiment of the present disclosure. The electrical fitting 300 includes a body 302 defining an inner cavity with upper and lower openings 303/305. The electrical fitting 300 includes at least one side opening which may be closed with a threaded plug 304. The electrical fitting 300 includes a brush barrier 320 resting against an abutment 311 between first and section portions of the inner cavity. In the exemplary embodiment, the brush barrier 320 is secured in place by friction between the brush barrier 320 and inner surfaces of the electrical fitting 300, a clamping force provided by the plug 304, or a combination of both.

A cable 340 extends into the electrical fitting 300. The cable 340 has a plurality of conductors 342 such as electrically conductive elements to transmit power or electrical signals and/or optical fibers to carry light in order to transmit optical signals.

As shown in FIG. 9B, the electrical fitting 300 may be filled with a liquid compound 350 which is prevented from passing into the lower portion of the inner cavity by the brush barrier 320. The brush barrier 320 receives and at least partially surrounds the conductors 342 of the cable 340 while maintaining a sufficient barrier to prevent sealing compounds from passing through.

Figure 10:
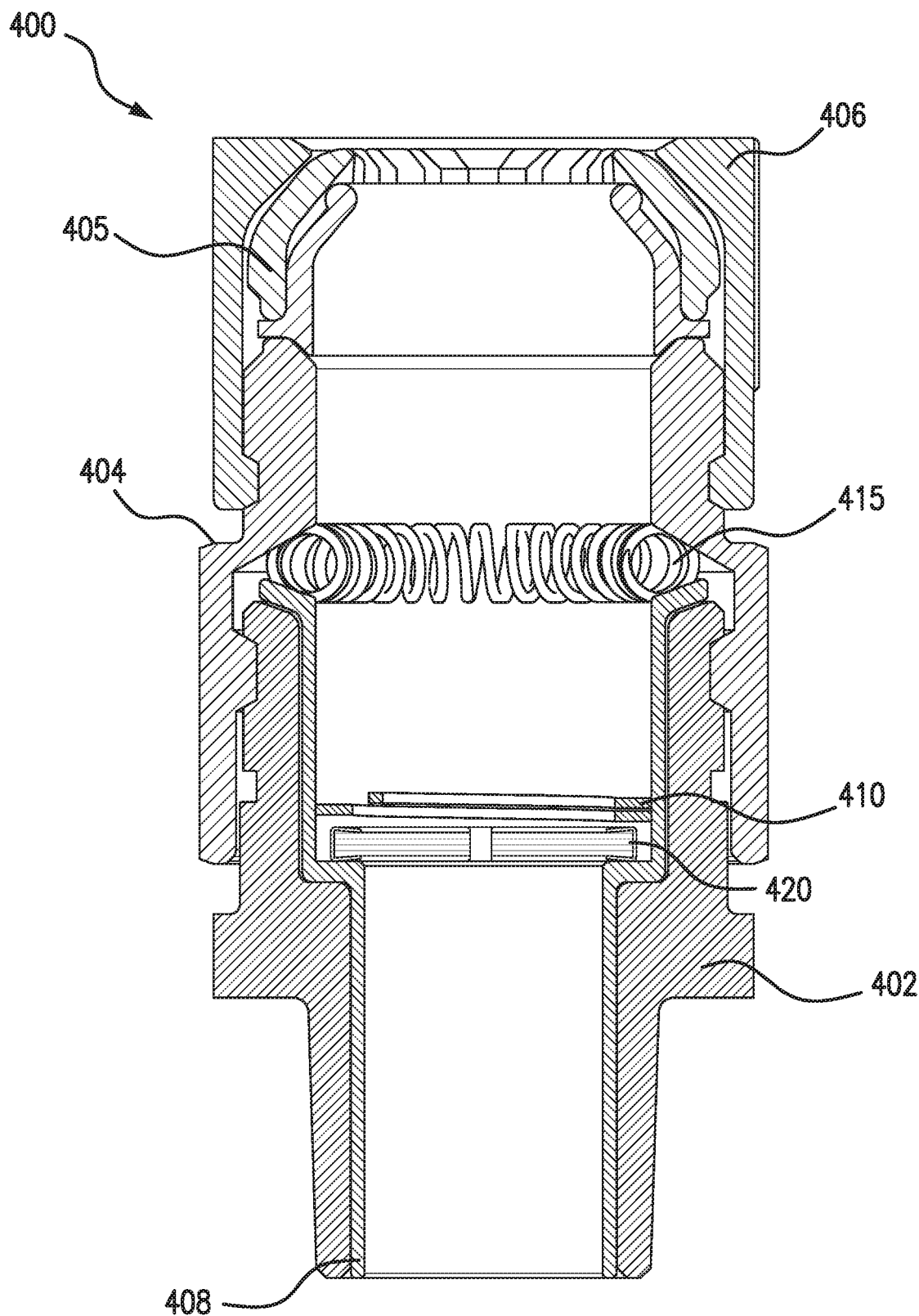
FIG. 10 is a sectional view of an electrical fitting according to an exemplary embodiment of the present disclosure.

FIG. 10 is a sectional view of another electrical fitting 400 according to an exemplary embodiment of the present disclosure adapted to receive a cable and/or a plurality of conductors. The electrical fitting 400 includes an entry component 402, a middle nut 404, a compressible back nut clamp 405, a back nut 406, a potting chamber 408, and a grounding spring 415. A brush barrier 420 is secured in the potting chamber 408, against an abutment, by means of alternative stop element. In this embodiment, an expandable lock ring 410 is used. The lock ring 410 may be compressed in diameter to allow it to be placed into the potting chamber 408 and thereafter expand in diameter to engage against an inner diameter of the potting chamber 408.

Figure 11A:
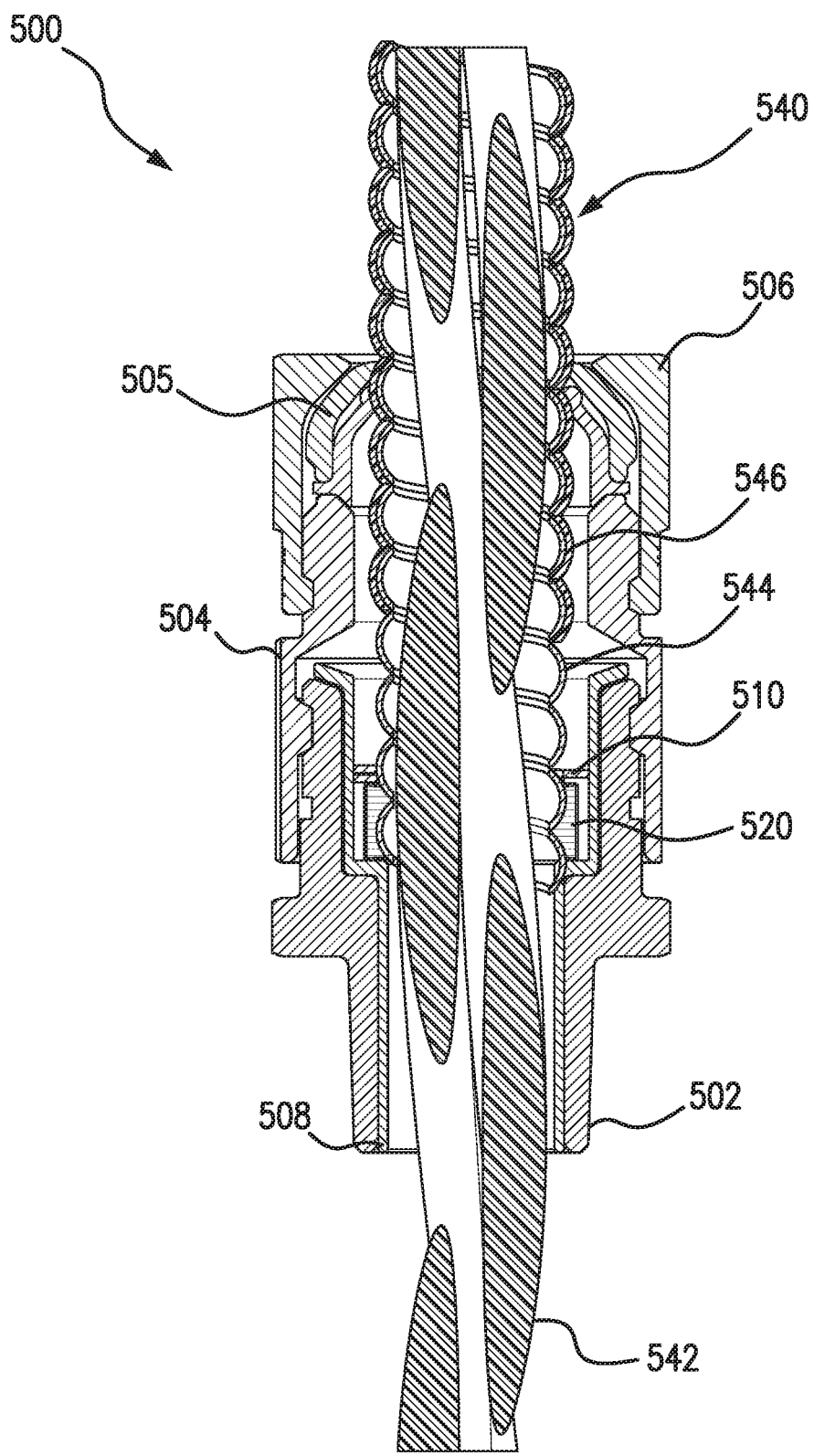
FIG. 11A is a sectional view of an electrical fitting according to an exemplary embodiment of the present disclosure.
Figure 11B:
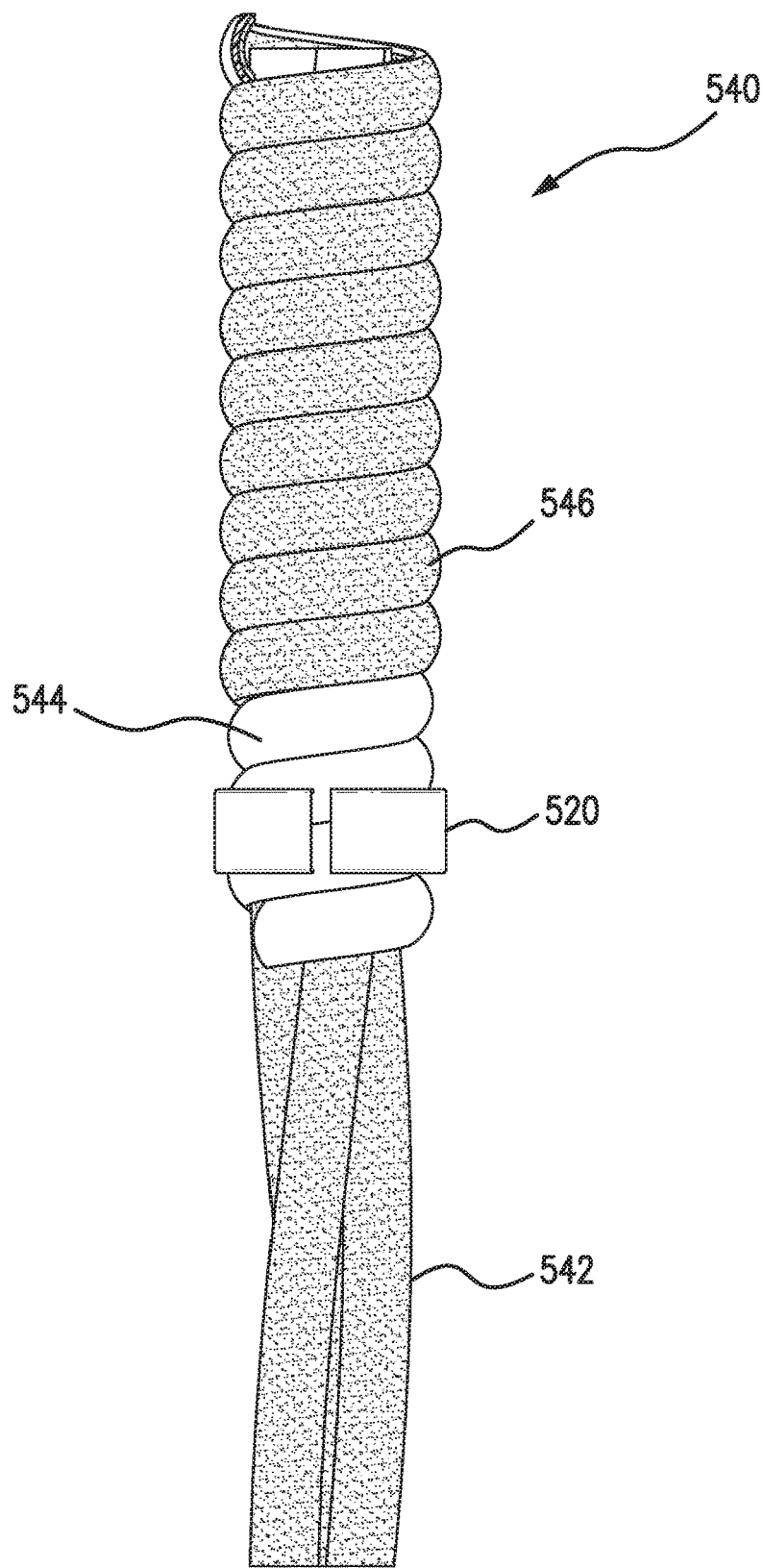
FIG. 11B is a front view of a cable and brush barrier used in the electrical fitting shown in FIG. 11A.

FIGS. 11A to 11B illustrate another embodiment of an electrical fitting 500 according to an exemplary embodiment of the present disclosure adapted to receive a cable 540. In this embodiment, the cable 540 has an inner conductive (e.g., metal) layer 544 and an outer non-conductive (e.g., plastic) layer 546. In the exemplary embodiment, the inner layer 544 is comprised of steel and the outer layer 546 is comprised of PVC. The inner layer 544 at least partially extends through a brush barrier 520. The brush barrier 520 may be secured in a potting chamber 508 with a stop element such as a lock ring 510.

The brush barrier 520 prevents a sealing compound (e.g., liquid epoxy) from passing beyond the brush barrier 520 before it cures within the electrical fitting 500. In this embodiment, the brush barrier 520 also grounds the cable 540. The brush barrier 520 has metal bristles which contact the inner layer 544 of the cable 540 and ground the cable 540 without requiring a grounding spring.

Figure 12:
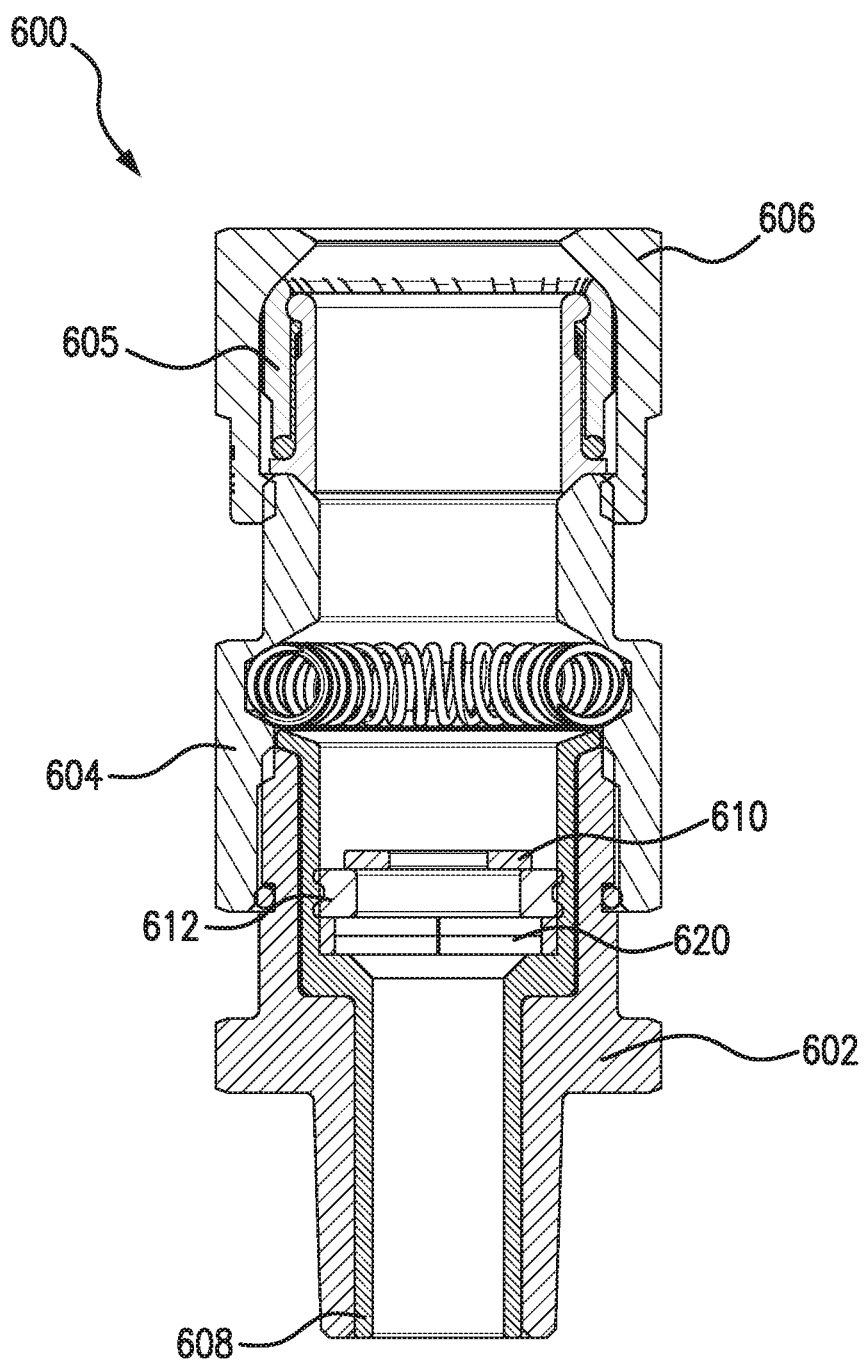
FIG. 12 is a sectional view of an electrical fitting according to an exemplary embodiment of the present disclosure.
Figure 13:
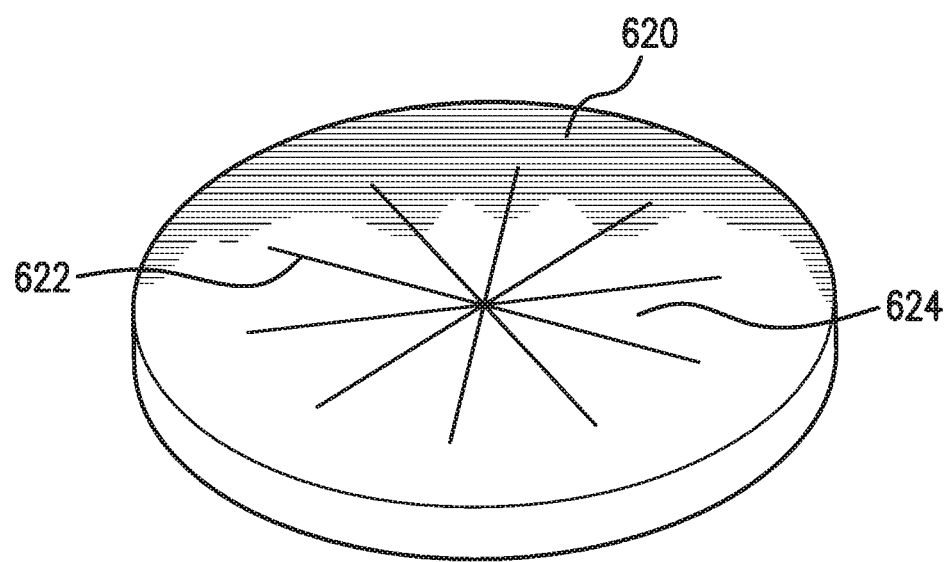
FIG. 13 is a perspective view of a barrier according to an exemplary embodiment of the present disclosure.

FIG. 12 illustrates another embodiment of an electrical fitting 600 according to an exemplary embodiment of the present disclosure and FIG. 13 illustrates another embodiment of a barrier 620. As in previous embodiments, the electrical fitting 600 may include an entry component 602, a middle nut 604, a compressible back nut clamp 605, and a back nut 606. A potting chamber 608 is slidably engaged within the entry component 602. The barrier 620 may be secured in the potting chamber 608 by a grommet 112 or other means described herein. In this embodiment, the barrier 620 is circular element including at least one layer of material with a plurality of slices 622 therethrough. As shown in FIG. 12, the barrier 620 may be two layers of the material providing twice the number of elements that can bend up or down. In a preferred embodiment, the material is a felt fiber material. In another embodiment, the material is silicon rubber. The slices 622 form a plurality of pie-shaped or wedged sections 624 (e.g., 6-10 sections) that bend up or down to create a central opening allowing conductors to extend through the barrier 620. In some embodiments, the barrier 620 may have a semi-rigid outer ring or rim as in previous embodiments.

The barrier 620 may be sized to fit a variety of electrical fittings. The barrier 620 is particularly useful for smaller diameters, though not limited thereto. By way of example, the barrier 620 may have an outside diameter of about 0.5 to about 0.696 in., with a sliced region having a diameter of about 0.348 to about 0.48 in, and a thickness of about 0.094 in. The brush barriers 120/220/320/420 discussed above can generally accommodate larger sizes such as diameters of about 0.770 to at least about 3.889 in with thicknesses from about 0.094 in. to at least about 0.156 in.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical fitting, comprising:
   a body having an inner cavity for receiving a plurality of conductors;
   an aperture within the inner cavity between a first portion of the inner cavity and a second portion of the inner cavity, the first portion having an exterior opening spaced apart from the aperture; and
   a brush barrier positioned within or adjacent to said aperture, said brush barrier including an outer rim and a plurality of bristles attached to and extending inwardly from the outer rim, the bristles being displaceable by the conductors,
   wherein said electrical fitting is configured to receive a sealing compound within the first portion of said inner cavity between the exterior opening of the first portion and said brush barrier, the sealing compound being at least partially prevented from propagating into the second portion of said inner cavity by said brush barrier.

2. The electrical fitting of claim 1, wherein the bristles have distal ends defining a central opening in said brush barrier, the conductors at least partially passing through the central opening.

3. The electrical fitting of claim 1, wherein said aperture includes an abutment, wherein said brush barrier rests against the abutment.

4. The electrical fitting of claim 3, further comprising a stop element engaged within the inner cavity and securing said brush barrier against the abutment.

5. The electrical fitting of claim 4, wherein the stop element is in threaded engagement with an inner surface of the inner cavity.

6. The electrical fitting of claim 4, wherein the stop element is one of a lock ring or a rubber grommet.

7. The electrical fitting of claim 1, wherein the outer rim of said brush barrier is non-continuous including a gap.

8. The electrical fitting of claim 1, wherein the outer rim of said brush barrier has a helical shape.

9. The electrical fitting of claim 1, wherein the brush barrier is at least partially secured within the inner cavity by friction between the outer rim and an inner surface of the inner cavity.

10. The electrical fitting of claim 1, wherein said body includes an entry component and a potting chamber slidably engaged within the entry component, wherein an interior of the potting chamber defines the first portion of the inner cavity.

11. The electrical fitting of claim 10, wherein the first portion of the inner cavity, defined in the potting chamber, is tapered such that it has an inner diameter that decreases along a length of the first portion of the inner cavity.

12. The electrical fitting of claim 1, wherein the outer rim of said brush barrier is comprised of at least one of brass, galvanized steel, stainless steel, or a polymer.

13. The electrical fitting of claim 1, wherein the bristles of said brush barrier are comprised of a synthetic fiber or a natural fiber.

14. An electrical fitting, comprising:
a body having an inner cavity for receiving a plurality of conductors;
an aperture within the inner cavity between a first portion of the inner cavity and a second portion of the inner cavity, the first portion having an exterior opening spaced apart from the aperture; and
a barrier positioned within or adjacent to said aperture, said barrier including an outer edge and a plurality of bendable elements extending inwardly from the outer edge;
wherein the barrier is one of a felt fiber barrier including a plurality of slices, the plurality of bendable elements being wedged sections defined by the slices or a brush barrier including an outer rim at the outer edge, the plurality of elements being bristles attached to and extending inwardly from the outer rim,
wherein said electrical fitting is configured to receive a sealing compound within the first portion of said inner cavity between the exterior opening of the first portion and said barrier, the sealing compound being at least partially prevented from propagating into the second portion of said inner cavity by said barrier.

15. The electrical fitting of claim 14, wherein said aperture includes an abutment, wherein said barrier rests against the abutment.

16. The electrical fitting of claim 15, further comprising a stop element engaged within the inner cavity and securing said barrier against the abutment.

17. The electrical fitting of claim 14, wherein the bristles of the brush barrier are comprised of a synthetic fiber or a natural fiber.

18. A method of assembling an electrical fitting, comprising steps of:
providing a barrier including an outer edge and a plurality of bendable elements extending inwardly from the outer edge;
placing the barrier within an inner cavity of the electrical fitting between a first portion of the inner cavity and a second portion of the inner cavity;
placing at least one conductor into the second portion of the inner cavity, a distal portion of the at least one conductor extending through the barrier and into the first portion of the inner cavity; and
filling the first portion of the inner cavity with a sealing compound, between the barrier and an exterior opening of the first portion spaced apart from the barrier, such that the barrier substantially prevents leakage of the sealing compound into the second portion of the inner cavity.

19. The method of claim 18, wherein the barrier is felt fiber barrier including a plurality of slices, the plurality of elements being wedged sections defined by the slices.

20. The method of claim 18, wherein the barrier is a brush barrier including an outer rim at the outer edge, the plurality of elements being bristles attached to and extending inwardly from the outer rim.

21. The method of claim 18, wherein the step of placing the barrier in the inner cavity includes placing the barrier against an abutment in the inner cavity.

22. The method of claim 18, wherein the barrier includes a first side and a second side, the second side being adjacent to the abutment, the method further comprising the step of securing a stop element within the inner cavity against the first side of the barrier.

23. The method of claim 22, wherein the stop element is in threaded engagement with an inner surface of the inner cavity.

24. The method of claim 22, wherein the stop element is a rubber grommet.

* * * * *